US011656146B2

(12) United States Patent
Nakhjavani et al.

(10) Patent No.: US 11,656,146 B2
(45) Date of Patent: May 23, 2023

(54) DIAGNOSTIC SYSTEM FOR A CLOSED FLUID SYSTEM

(71) Applicant: THE BOEING COMPANY, Chicago, IL (US)

(72) Inventors: Omid B. Nakhjavani, Tukwila, WA (US); Ryan K. Coleman, Seal Beach, CA (US); Franz David Betz, Seattle, WA (US); Greg Jackson, Tukwila, WA (US); Sean Warlick, Tukwila, WA (US); Darren Puigh, Bellevue, WA (US); Andrey Aleksandrovich Zaikin, Tukwila, WA (US); James Schimert, Tukwila, WA (US); Steven C. Runo, Seattle, WA (US)

(73) Assignee: The Boeing Company, Arlington, VA (US)

(*) Notice: Subject to any disclaimer, the term of this patent is extended or adjusted under 35 U.S.C. 154(b) by 872 days.

(21) Appl. No.: 15/833,564

(22) Filed: Dec. 6, 2017

(65) Prior Publication Data
US 2019/0170606 A1 Jun. 6, 2019

(51) Int. Cl.
*G01M 3/28* (2006.01)
*G05B 23/02* (2006.01)

(52) U.S. Cl.
CPC ......... *G01M 3/2876* (2013.01); *G05B 23/024* (2013.01)

(58) Field of Classification Search
CPC ...... G01M 3/2876; G01M 3/007; G01M 3/04; G01M 3/207
See application file for complete search history.

(56) References Cited

U.S. PATENT DOCUMENTS 4,825,198 A * 4/1989 Rolker ............... G01M 3/2876
340/605
5,616,824 A * 4/1997 Abdel-Malek ...... F16K 37/0083
324/73.1

(Continued)

OTHER PUBLICATIONS

Chapter 12_Hydraulic and Pneumatic Power Systems, https://www.sweethaven02.com/Aviation/MaintHandbook/ama_Ch12.pdf, pp: all (Year: 2013).*

*Primary Examiner* — John C Kuan
(74) *Attorney, Agent, or Firm* — Womble Bond Dickinson (US) LLP (57) ABSTRACT

A diagnostic system for a closed fluid system is provided. The closed fluid system includes a first fluid subsystem and a second fluid subsystem connected using a valve or valve/actuator. The diagnostic system includes a first sensor disposed in the first fluid subsystem, a second sensor disposed in the second fluid subsystem and a computer. The computer receives first time-ordered fluid level measurements and second time-ordered fluid level measurements from respectively the first sensor and the second sensor and performs a comparison of first fluid level of the first fluid subsystem and second fluid level of the second fluid subsystem. The computer produces a notification indicating a predicted transfer of hydraulic fluid when the first time-ordered fluid level measurements and the second time-ordered fluid level measurements have at least a threshold divergence and outputs the notification for display to a user.

19 Claims, 5 Drawing Sheets

(56) References Cited

U.S. PATENT DOCUMENTS

| | | | | |
|---|---|---|---|---|
| 2004/0159100 A1* | 8/2004 | Bernard | ................ | B64C 13/12 |
| | | | | 60/325 |
| 2005/0267710 A1* | 12/2005 | Heavner III | ............ | F23N 5/003 |
| | | | | 702/183 |
| 2006/0074496 A1* | 4/2006 | Taware | .................... | G05B 9/02 |
| | | | | 700/11 |
| 2010/0276989 A1* | 11/2010 | Metzger, Jr. | ............ | B60T 15/14 |
| | | | | 303/20 |
| 2013/0006447 A1* | 1/2013 | Thibault | ............... | B60T 8/1703 |
| | | | | 701/3 |
| 2013/0116941 A1* | 5/2013 | Lie-Nielsen | ........... | G01F 15/063 |
| | | | | 702/46 |
| 2014/0195172 A1* | 7/2014 | Le | ............................ | G06F 17/00 |
| | | | | 702/47 |
| 2017/0050629 A1* | 2/2017 | Kim | ....................... | B60T 13/686 |
| 2017/0067578 A1* | 3/2017 | Hoffman | .................... | F02C 9/18 |
| 2018/0215356 A1* | 8/2018 | Knight | .................... | B64C 25/46 |
| 2019/0063474 A1* | 2/2019 | Brinkman | ............. | F15B 19/005 |

\* cited by examiner

DIAGNOSTIC SYSTEM FOR A CLOSED FLUID SYSTEM

TECHNOLOGICAL FIELD

The present disclosure relates generally to a diagnostic system for a closed fluid system and, in particular, to a diagnostic system for a closed fluid system including two fluid subsystems connected via a valve or actuator.

BACKGROUND

A closed fluid system retains and recirculates fluid that flows within the system. Some closed fluid systems include two fluid subsystems connected via a valve or actuator. For example, some aircraft include independent hydraulic systems connected via a shuttle valve, and in some models, these hydraulic systems are sometimes referred to as system A and system B. In these aircraft, the shuttle valve allows hydraulic fluid to flow between system A and system B. When the shuttle valve is in the INA position, the valve allows hydraulic fluid to flow from system B to the common downstream hydraulic plumbing and prevents system A fluid from flowing into said plumbing. When the shuttle valve is in the INB position, the valve allows hydraulic fluid to flow from system A to the common downstream hydraulic plumbing and prevents system B fluid from flowing into said plumbing.

A malfunction of the shuttle valve may result in fluid leakage between system A and system B through the failed valve. This may include the flow of hydraulic fluid in either direction when the valve is in a closed position. The failed shuttle valve may negatively affect the functionality of the hydraulic systems on the aircraft. More generally, a failed valve between two fluid subsystems may negatively affect the functionality of the fluid subsystems or the broader closed fluid system.

Therefore it would be desirable to have a system and method that take into account at least some of the issues discussed above, as well as other possible issues.

BRIEF SUMMARY

Example implementations of the present disclosure are directed to a diagnostic system for a closed fluid system including two fluid subsystems connected via a valve or actuator, such as a shuttle valve. The diagnostic system provides a notification indicating a predicted malfunction of the valve or actuator connecting the two fluid subsystems in the closed fluid system. The notification can improve scheduling of maintenance of the closed fluid system. For example, based on the notification, technicians can check, repair and/or replace the valve or actuator in a convenient and timely manner to prevent fluid leakage and avoid malfunction of the closed fluid system.

The present disclosure thus includes, without limitation, the following example implementations.

Some example implementations provide a diagnostic system for a closed fluid system composed of a first fluid subsystem and a second fluid subsystem connected using a valve or actuator there between, the diagnostic system comprising: a first sensor disposed in the first fluid subsystem and configured to measure a first fluid level of the first fluid subsystem, and output first time-ordered fluid level measurements corresponding thereto; a second sensor disposed in the second fluid subsystem and configured to measure a second fluid level of the second fluid subsystem, and output second time-ordered fluid level measurements corresponding thereto; and a computer coupled to the first sensor and the second sensor, and configured to: receive the first time-ordered fluid level measurements and the second time-ordered fluid level measurements from respectively the first sensor and the second sensor; perform a comparison of the first fluid level and the second fluid level from the first time-ordered fluid level measurements and the second time-ordered fluid level measurements; produce a notification indicating a predicted malfunction of the valve or actuator when, based on the comparison, the first time-ordered fluid level measurements and the second time-ordered fluid level measurements have at least a threshold divergence; and output the notification for display to a user.

In some example implementations of the diagnostic system of any preceding example implementation, or any combination of preceding example implementations, the computer being configured to perform the comparison includes being configured to determine a correlation and an absolute difference between the first time-ordered fluid level measurements and the second time-ordered fluid level measurements that define a divergence thereof, and the computer being configured to produce the notification includes being configured to produce the notification when the divergence is at least the threshold divergence.

In some example implementations of the diagnostic system of any preceding example implementation, or any combination of preceding example implementations, the divergence is at least the threshold divergence when the correlation is less than a predefined negative correlation, and the absolute difference is greater than a predefined absolute difference.

In some example implementations of the diagnostic system of any preceding example implementation, or any combination of preceding example implementations, the computer is further configured to filter out any of the first time-ordered fluid level measurements and the second time-ordered fluid level measurements that are outside a range of accepted measurements before the comparison of the first fluid level with the second fluid level is performed from only those of the first time-ordered fluid level measurements and the second time-ordered fluid level measurements that are within the range.

In some example implementations of the diagnostic system of any preceding example implementation, or any combination of preceding example implementations, the computer is further configured to: perform comparisons of respectively the first time-ordered fluid level measurements and the second time-ordered fluid level measurements; produce a second notification indicating fluid transfer through the valve or actuator when, based on the comparisons, the first time-ordered fluid level measurements or the second time-ordered fluid level measurements indicate an overfill condition of respectively the first fluid subsystem or the second fluid subsystem; and output the second notification for display to the user.

In some example implementations of the diagnostic system of any preceding example implementation, or any combination of preceding example implementations, the computer being configured to perform the comparisons includes being configured to determine a first standard deviation of the first time-ordered fluid level measurements, and a second standard deviation of the second time-ordered fluid level measurements, and the computer being configured to produce the second notification includes being configured to produce the second notification when the first standard deviation is less than a threshold standard deviation and the first time-ordered fluid level measurements are above a threshold fluid level, or the second standard deviation is less than the threshold standard deviation and the second time-ordered fluid level measurements are above the threshold fluid level.

In some example implementations of the diagnostic system of any preceding example implementation, or any combination of preceding example implementations, the diagnostic system is onboard an aircraft, and the first fluid subsystem and the second fluid subsystem are independent hydraulic systems of the aircraft.

In some example implementations of the diagnostic system of any preceding example implementation, or any combination of preceding example implementations, the valve is a brake shuttle valve connecting the independent hydraulic systems, and the predicted inter-system fluid leakage indicates a malfunction of one or more of the brake shuttle valves when the brake shuttle valves are closed.

In some example implementations of the diagnostic system of any preceding example implementation, or any combination of preceding example implementations, the valve is a left engine thrust reverser shuttle valve connecting the independent hydraulic systems, and the predicted inter-system fluid leakage indicates a malfunction of the left engine thrust reverser shuttle valve when the valves is closed.

In some example implementations of the diagnostic system of any preceding example implementation, or any combination of preceding example implementations, the actuator is a rudder power control unit connecting the independent hydraulic systems, and the predicted inter-system fluid leakage indicates a malfunction of the rudder power control unit.

In some example implementations of the diagnostic system of any preceding example implementation, or any combination of preceding example implementations, the valve is a landing gear transfer valve connecting the independent hydraulic systems, and the predicted inter-system fluid leakage indicates a malfunction of the landing gear transfer valve.

In some example implementations of the diagnostic system of any preceding example implementation, or any combination of preceding example implementations, the computer is a component of an aircraft condition monitoring system onboard the aircraft.

In some example implementations of the diagnostic system of any preceding example implementation, or any combination of preceding example implementations, the aircraft includes a datalink system configured to transmit the first time-ordered fluid level measurements and the second time-ordered fluid level measurements to an operations center including the computer.

Some example implementations provide a method of examining a closed fluid system composed of a first fluid subsystem and a second fluid subsystem connected using a valve or actuator, the method implemented by a diagnostic system including a first sensor disposed in the first fluid subsystem, a second sensor disposed in the second fluid subsystem, and a computer coupled to the first sensor and the second sensor, the method comprising: measuring a first fluid level of the first fluid subsystem, and outputting first time-ordered fluid level measurements corresponding thereto, using the first sensor; measuring a second fluid level of the second fluid subsystem, and outputting second time-ordered fluid level measurements corresponding thereto, using the second sensor; and using the computer, performing a comparison of the first fluid level and the second fluid level from the first time-ordered fluid level measurements and the second time-ordered fluid level measurements; producing a notification indicating a predicted malfunction of the valve or actuator when, based on the comparison, the first time-ordered fluid level measurements and the second time-ordered fluid level measurements have at least a threshold divergence; and outputting the notification for display to a user.

In some example implementations of the method of any preceding example implementation, or any combination of preceding example implementations, performing the comparison includes determining a correlation and an absolute difference between the first time-ordered fluid level measurements and the second time-ordered fluid level measurements that define a divergence thereof, and producing the notification includes producing the notification when the divergence is at least the threshold divergence.

In some example implementations of the method of any preceding example implementation, or any combination of preceding example implementations, the divergence is at least the threshold divergence when the correlation is less than a predefined negative correlation, and the absolute difference is greater than a predefined absolute difference.

In some example implementations of the method of any preceding example implementation, or any combination of preceding example implementations, the method further comprising filtering out any of the first time-ordered fluid level measurements and the second time-ordered fluid level measurements that are outside a range of accepted measurements before the comparison of the first fluid level with the second fluid level is performed from only those of the first time-ordered fluid level measurements and the second time-ordered fluid level measurements that are within the range.

In some example implementations of the method of any preceding example implementation, or any combination of preceding example implementations, the method further comprising: performing comparisons of respectively the first time-ordered fluid level measurements and the second time-ordered fluid level measurements; producing a second notification using the computer, the second notification indicating fluid transfer through the valve when, based on the comparisons, the first time-ordered fluid level measurements or the second time-ordered fluid level measurements indicate an overfill condition of respectively the first fluid subsystem or the second fluid subsystem; and outputting the second notification for display to the user.

In some example implementations of the method of any preceding example implementation, or any combination of preceding example implementations, performing the comparisons includes determining a first standard deviation of the first time-ordered fluid level measurements, and a second standard deviation of the second time-ordered fluid level measurements, and producing the second notification includes producing the second notification when the first standard deviation is less than a threshold standard deviation and the first time-ordered fluid level measurements are above a threshold fluid level, or the second standard deviation is less than the threshold standard deviation and the second time-ordered fluid level measurements are above the threshold fluid level.

In some example implementations of the method of any preceding example implementation, or any combination of preceding example implementations, the diagnostic system is onboard an aircraft, and the first fluid subsystem and the second fluid subsystem are independent hydraulic systems of the aircraft.

In some example implementations of the method of any preceding example implementation, or any combination of preceding example implementations, the valve is a brake shuttle valve connecting the independent hydraulic systems, and the predicted inter-system fluid leakage indicates a malfunction of one or more of the brake shuttle valves when the brake shuttle valves are closed.

In some example implementations of the method of any preceding example implementation, or any combination of preceding example implementations, the valve is a left engine thrust reverser shuttle valve connecting the independent hydraulic systems, and the predicted inter-system fluid leakage indicates a malfunction of the left engine thrust reverser shuttle valve when the valve is closed.

In some example implementations of the method of any preceding example implementation, or any combination of preceding example implementations, the actuator is a rudder power control unit connecting the independent hydraulic systems, and the predicted inter-system fluid leakage indicates a malfunction of the rudder power control unit.

In some example implementations of the method of any preceding example implementation, or any combination of preceding example implementations, the valve is a landing gear transfer valve connecting the independent hydraulic systems, and the predicted inter-system fluid leakage indicates a malfunction of the landing gear transfer valve.

In some example implementations of the method of any preceding example implementation, or any combination of preceding example implementations, the computer is a component of an aircraft condition monitoring system onboard the aircraft.

In some example implementations of the method of any preceding example implementation, or any combination of preceding example implementations, the aircraft includes a datalink system, and the method further comprises the datalink system transmitting the first time-ordered fluid level measurements and the second time-ordered fluid level measurements to an operations center including the computer.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to a diagnostic system for a closed fluid system and, in particular, to a diagnostic system for a closed fluid system including two fluid subsystems connected by a valve or actuator. As described herein, a fluid system is a system that contains a fluid (liquid or gas) that moves though the system, and in which a pressure difference in the system creates a net force that causes the fluid to move or perform some function (e.g., move some machinery or open/close a valve). A closed fluid system is a fluid system that retains and recirculates a working fluid. In some examples, a fluid system may include a hydraulic circuit and be used by hydraulic machinery that use(s) liquid fluid power to do work. Each of the fluid subsystems may be considered separate and independent fluid system in which the two are connected by a valve or actuator, or each fluid subsystem may be a portion of the fluid system that depends on other components of the fluid system for operation.

Example implementations of the present disclosure are applicable to any of a number of different types of closed fluid systems. As described above in the background section, for example, some aircrafts include independent hydraulic systems connected via a shuttle valve, and in some models, these hydraulic systems are sometimes referred to as system A and system B. In these aircraft, the shuttle valve allows hydraulic fluid to flow between system A and system B. When the shuttle valve is in the INA position, the valve allows hydraulic fluid to flow from system B to the common downstream hydraulic plumbing and prevents system A fluid from flowing into said plumbing. When the shuttle valve is in the INB position, the valve allows hydraulic fluid to flow from system A to the common downstream hydraulic plumbing and prevents system B fluid from flowing into said plumbing.

Figure 1:
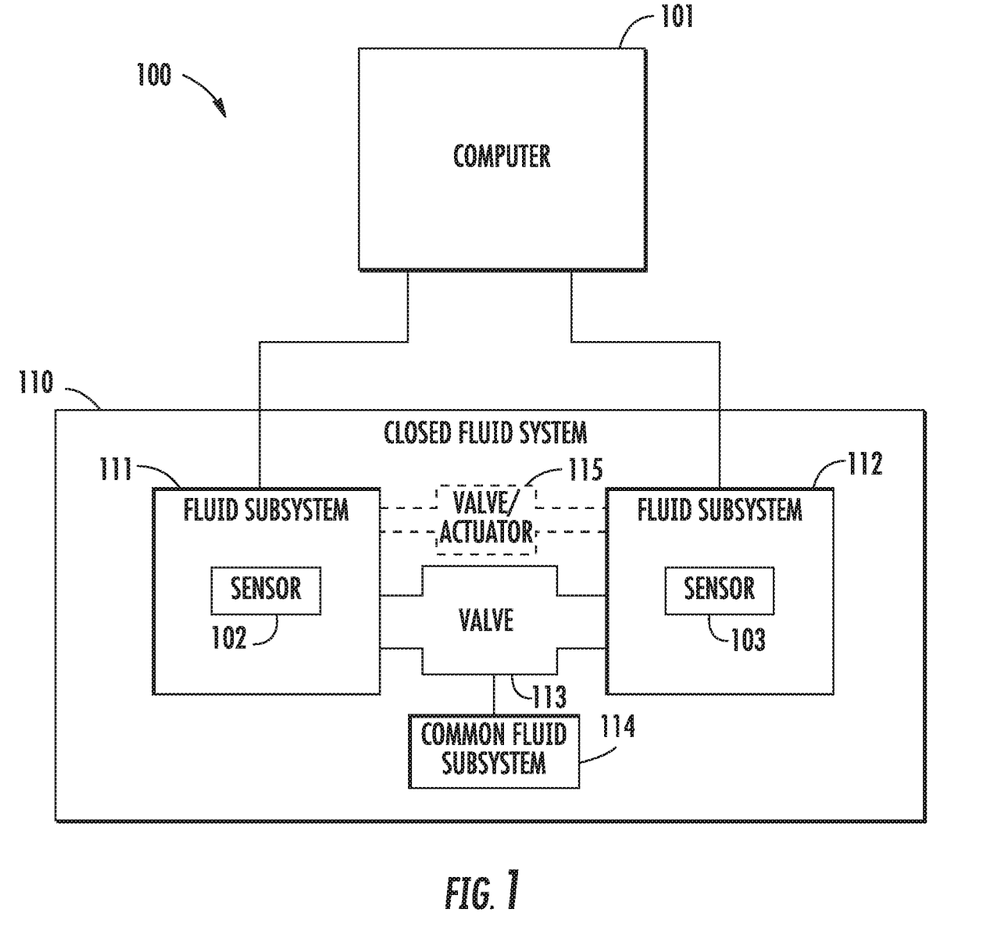
FIG. 1 illustrates a diagnostic system for a closed fluid system according to example implementations of the present disclosure.

FIG. 1 illustrates a diagnostic system 100 for a closed fluid system 110 according to example implementations of the present disclosure. The closed fluid system 110 includes: an independent first fluid subsystem 111 and an independent second fluid subsystem 112 connected via a valve 113 to a third (common) fluid subsystem 114, or an independent first fluid subsystem 111 and an independent second fluid subsystem 112 connected via a valve/actuator 115. The first, second, and third fluid subsystems 111, 112, 114 can include reservoirs containing fluid inside. In some implementations, the valve 113 is a shuttle valve that allows hydraulic fluid to flow between the first fluid subsystem 111 and the third subsystem 114 or between the second fluid subsystem 112 and the third fluid subsystem 114, although the valve 113 can also be other type of valves or actuators such as transfer valves, isolation valves, selector valves, and/or metering valves. As indicated above, in some implementations, the diagnostic system 100 is onboard an aircraft, and the first fluid subsystem 111 and the second fluid subsystem 112 are two independent hydraulic systems (e.g., system A and system B). In some of these implementations, the valve 113 is a brake shuttle valve connecting the first or second fluid subsystems 111, 112 to the third (common) fluid subsystem 114. In some implementations, a single actuator 115 allows the first fluid subsystem 111 and the second fluid subsystem 112 to provide redundant power, although the actuator 115 can also be a power control unit, feel computer, and/or power transfer unit. As indicated above, in some implementations, the diagnostic system 100 is onboard an aircraft, and the first fluid subsystem 111 and the second fluid subsystem 112 are two independent hydraulic systems (e.g., system A and system B). In some of these implementations, the actuator 115 is a rudder power control unit with connections to the first and second fluid subsystems 111, 112.

As shown in FIG. 1, the diagnostic system 100 includes a computer 101 to which a first sensor 102 and a second sensor 103 are coupled, such as through data communication links, a data bus or the like. In some implementations, the first sensor 102 is disposed in the first fluid subsystem 111 to measure a first fluid level of the first fluid subsystem 111. Similarly, the second sensor 103 is disposed in the second fluid subsystem 112 to measure a second fluid level of the second fluid subsystem 112. The sensors 102 and 103 can be bubblers or differential-pressure sensors or other type of sensors that are used to measure fluid level. The sensors may also include communication interface to transmit measurement data to the computer 101 through data communication links. In some examples, one or more of the sensors 102, 103 are configured to measure the fluid level when the valve is closed. Based on the received measurement data from the sensors 102, 103, the computer 101 can determine whether fluid leakage occurs between the two fluid subsystems 111, 112 and predict whether the valve 113 or actuator 115 is likely to fail, as will be described below.

Figure 2:
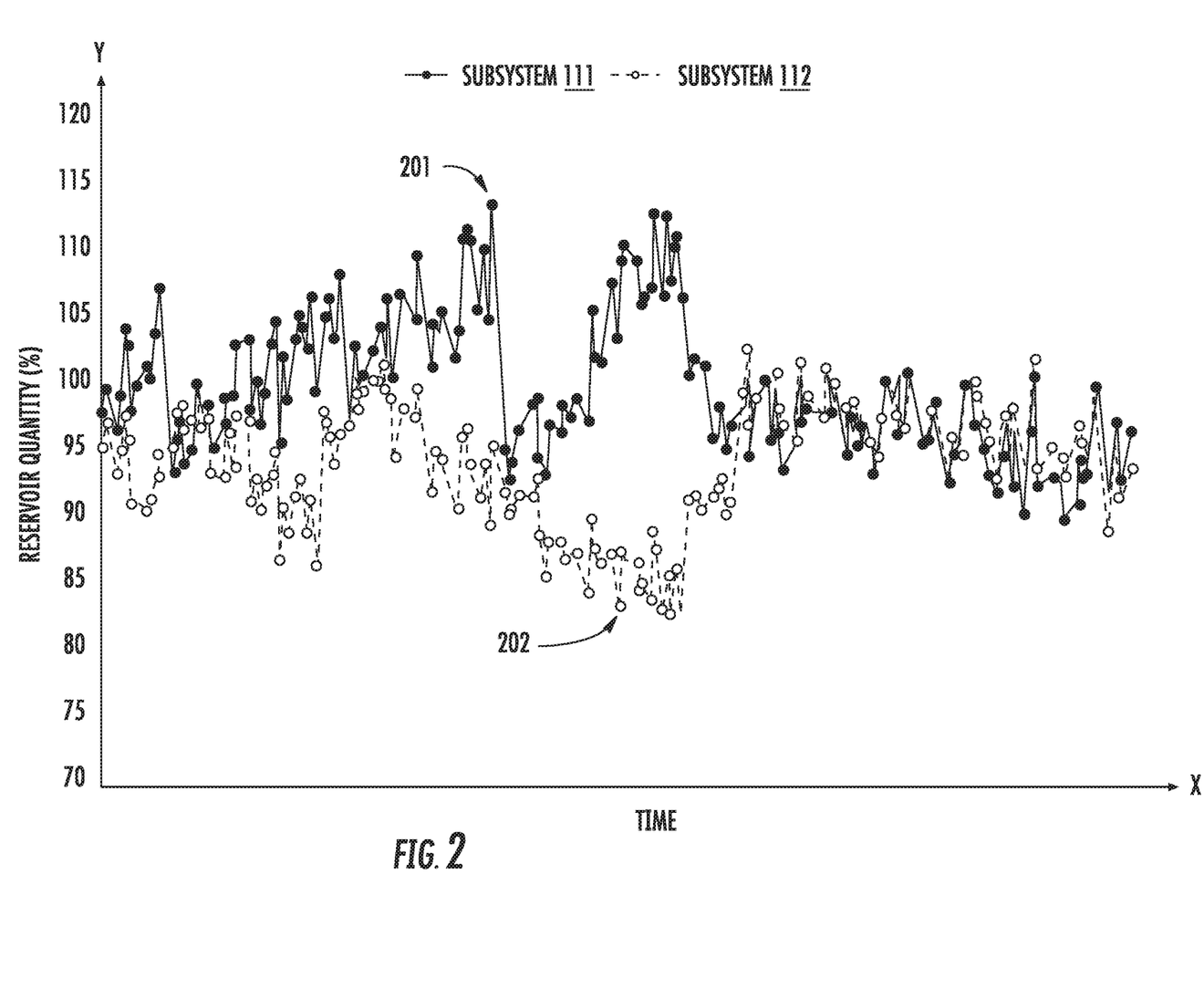
FIG. 2 illustrates time-ordered fluid level measurements of two fluid subsystems on an aircraft measured by sensors of the diagnostic system, according to various example implementations.

FIG. 2 illustrates time-ordered fluid level measurements of the two fluid subsystems 111 and 112 on an aircraft measured by respective sensors 102 and 103 of the diagnostic system 100, according to various example implementations. As shown in FIG. 2, the X axis indicates times of fluid level measurements measured by sensors 102 and 103. For example, in FIG. 2, the fluid level measurements are measured during a particular time period for the aircraft. The Y axis indicates reservoir quantities of the two fluid subsystems in percentage. For example, in FIG. 2, the Y axis indicates reservoir quantities from 70% to 120% of the capacity of the two fluid subsystems 111, 112. The reservoir quantities in percentage reflect the fluid levels of the two fluid subsystems 111, 112.

As also shown, the points connected by the solid line indicate first time-ordered fluid level measurements measured by the sensor 102 for the first fluid subsystem 111. Similarly, the points connected by the dashed line indicate second time-ordered fluid level measurements measured by the sensor 103 for the second fluid subsystem 112. Each point indicates one fluid level measurement measured at a specific time. For example, point 201 indicates a fluid level measurement measured by the sensor 102 for the first fluid subsystem 111, and the measured reservoir quantity is 114%. Similarly, point 202 indicates a fluid level measurement measured by the sensor 103 for the second fluid subsystem 112, and the measured reservoir quantity is 83%. All the measurements may be performed by the sensors 102, 103 after the engine of the aircraft is turned off, e.g., after the aircraft has landed. In some implementations, the sensors 102, 103 output and transmit the time-ordered fluid level measurements to the computer 101 through data communication links for further processing.

Figure 3:
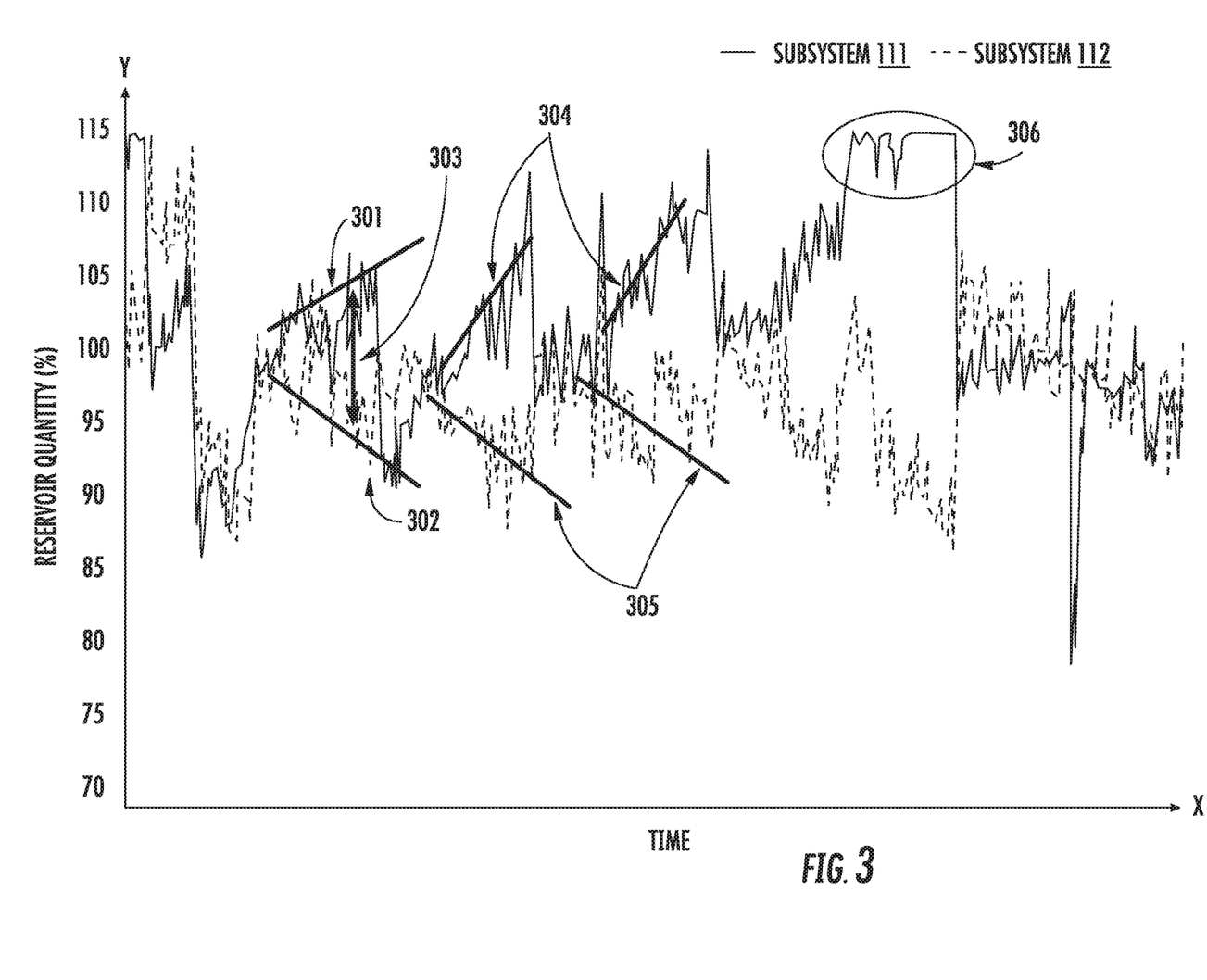
FIG. 3 illustrates changing of time-ordered fluid level measurements of two fluid subsystems on an aircraft, according to various example implementations.

FIG. 3 illustrates changing of time-ordered fluid level measurements of the two fluid subsystems 111 and 112 on an aircraft, according to various example implementations. Similar as described above, in FIG. 3, the X axis indicates fluid level measurements measured by sensors 102 and 103 over a particular time period for the aircraft. The Y axis indicates reservoir quantities of the two fluid subsystems in percentage. The solid line represents the first time-ordered fluid level measurements and the dashed line represents the second time-ordered fluid level measurements. The multiple points representing each measurement are not shown for simplicity of illustration. All the measurements may be performed by the sensors 102, 103 after the engine of the aircraft is turned off.

As shown in FIG. 3, the time-ordered fluid level measurements of the two fluid subsystems 111 and 112 show the changing of the fluid level of the two fluid subsystems 111, 112. For example, the slash 301 indicates that the measured reservoir quantity of the first fluid subsystem 111 has an increasing trend. In the same time period, the slash 302 indicates that the measured reservoir quantity of the second fluid subsystem 112 has a decreasing trend. Thus, the difference between the fluid level of the two fluid subsystems 111, 112 tends to increase during this time period. As shown, the absolute difference between the fluid level (the reservoir quantity) of the two fluid subsystems 111, 112 is around 15% (i.e., 105%–95%) at a particular instance as indicted by the double arrow 303. Also, the difference between the fluid level of the two fluid subsystems 111, 112 tends to increase during other portions of the particular time period, as indicated by slashes 304 and 305. As shown, although the fluid levels of the two fluid subsystems 111, 112 fluctuate during the time period, the overall trend is that the difference between the fluid level of the two fluid subsystems 111, 112 tends to increase as indicated by slashes 304 and 305.

When in the same time period, the fluid level of the first fluid subsystem 111 has an increasing trend and the fluid level of the second fluid subsystem 112 has a decreasing trend, it may indicate that fluid flows counter to an intended and designed operation of the closed fluid system 110, or the first fluid subsystem 111, the second fluid subsystem 112 or the valve 113 or valve/actuator 115. In the context of a shuttle valve that allows fluid to flow from the first fluid subsystem 111 to the third fluid subsystem 114 while preventing fluid from the second fluid subsystem 112 from entering the first or third fluid subsystems 111, 114, this operation counter to the intended and designed operation may be fluid flow from the second fluid subsystem 112 to the first fluid subsystem 111 when the valve 113 is closed. That is, it may indicate that fluid leakage occurs between the two fluid subsystems 111, 112. This type of fluid leakage is also referred to as inter-system fluid leakage that occurs between the two independent fluid subsystems when the valve is closed. In some implementations, the computer 101 receives the first and second time-ordered fluid level measurements from respectively the first sensor 102 and the second sensor 103. Based on the received first and second time-ordered fluid level measurements, the computer 101 can determine the difference between the fluid levels of the two independent fluid subsystems. The determined difference is a relevant factor for determining whether fluid leakage occurs between the two independent fluid subsystems 111, 112 and predicting whether the valve 113, 115 is likely to fail. In the context of an actuator 115 that receives power simultaneously from the first fluid subsystem 111 and the second fluid subsystem 112, this operation counter to the intended and designed operation may be fluid flow from the second fluid subsystem 112 to the first fluid subsystem 111 through the valve/actuator 115. That is, it may indicate that fluid leakage occurs between the two independent fluid subsystems 111, 112. This type of fluid leakage is also referred to as inter-system fluid leakage that occurs between the two independent fluid subsystems 111, 112 through the valve/actuator 115. In some implementations, the computer 101 receives the first and second time-ordered fluid level measurements from respectively the first sensor 102 and the second sensor 103. Based on the received first and second time-ordered fluid level measurements, the computer 101 can determine the difference between the fluid levels of the two independent fluid subsystems 111, 112. The determined difference is a relevant factor for determining whether fluid leakage occurs between the two independent fluid subsystems 111, 112 and predicting whether the valve/actuator 115 is likely to fail.

In some scenarios, for example, when the technicians perform maintenance refill actions and/or manual rebalancing to the two independent fluid subsystems 111 and 112, the increasing difference between the fluid levels of the two fluid subsystems may not indicate an inter-system fluid leakage. Thus, in order to provide reliable prediction of whether the valve 113 or valve/actuator 115 is likely to fail, in some implementations, the computer 101 also determines a correlation between the first and second time-ordered fluid level measurements. Based on the correlation and the difference between the first and second time-ordered fluid level measurements, the computer can make a reliable prediction of whether and/or when the valve/actuator is likely to fail, as will be described below.

Figure 4:
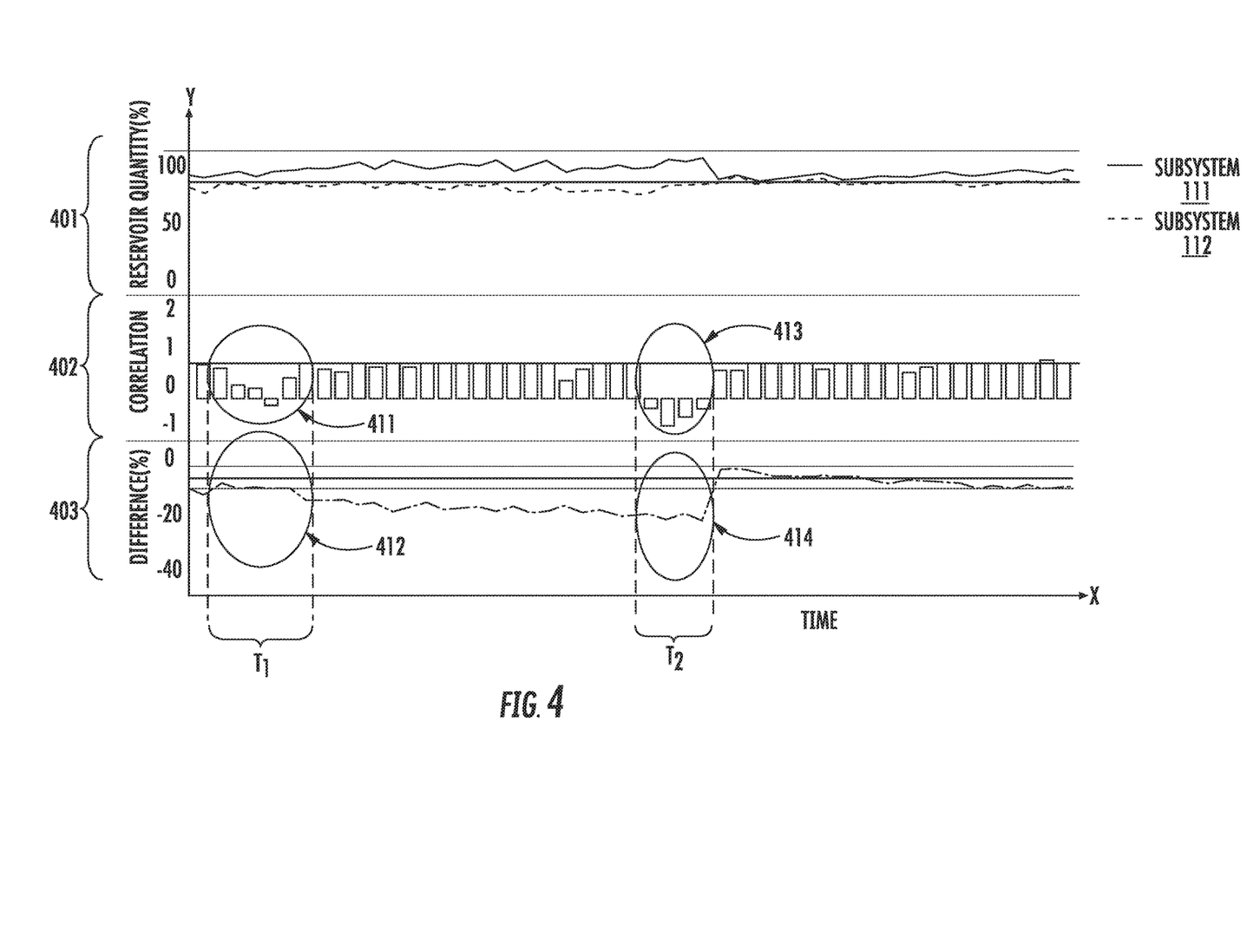
FIG. 4 illustrates a correlation and a difference between time-ordered fluid level measurements of two fluid subsystems on an aircraft, according to various example implementations.

FIG. 4 illustrates the correlation and the difference between the first and second time-ordered fluid level measurements, according to various example implementations. As shown in FIG. 4, the X axis indicates times during a time period. The Y axis includes three parts. Part 401 indicates the reservoir quantities of the two independent fluid subsystems 111 and 112 in percentage. Similarly as described above, in part 401, the solid line represents the first time-ordered fluid level measurements and the dashed line represents the second time-ordered fluid level measurements. Part 402 indicates the correlation between the first and second time-ordered fluid level measurements during the time period. In part 402, each bar indicates a correlation value between the first and second time-ordered fluid level measurements at a specific time. Part 403 indicates the difference between the first and second time-ordered fluid level measurements during the time period. As shown, in part 403, the difference at a specific time is the reservoir quantity of the second fluid subsystem 112 subtracted from the corresponding reservoir quantity of the first fluid subsystem 111 measured at that time (although, of course, this could be reversed) as a percentage.

As also shown, during the time period T1, the correlation values between the first and second time-ordered fluid level measurements are mostly positive (only one correlation value is slightly negative around −0.1), as indicated by circle 411. The mostly positive correlation values indicate that the fluid level of the first fluid subsystem 111 and the fluid level of the second fluid subsystem 112 are mostly changing in the same way, e.g., both increasing or both decreasing during the time period T1. Also, the differences between the first and second time-ordered fluid level measurements during the time period T1 are within a moderate range from −3% to −10%, as indicated by circle 412. Considering both the correlation values and the differences between the first and second time-ordered fluid level measurements, it is most likely that the technicians are performing maintenance refill actions to and/or manual rebalancing of the two fluid subsystems during the time period T1. That is, it is most likely that there is no inter-system fluid leakage occurring between the two fluid subsystems during the time period T1.

On the other hand, during the time period T2, the correlation values between the first and second time-ordered fluid level measurements are all negative as indicated by circle 413. The negative correlation values indicate that the fluid level of the first fluid subsystem 111 and the fluid level of the second fluid subsystem 112 are changing in an opposite way, e.g., the fluid level of the first fluid subsystem is increasing and the fluid level of the second fluid subsystem is decreasing during the time period T2. Also, the differences between the first and second time-ordered fluid level measurements during the time period T2 are within a significant range from −15% to −20%, as indicated by circle 414. Considering both the correlation values and the differences between the first and second time-ordered fluid level measurements, it is most likely that there is an inter-system fluid leakage occurring between the two independent fluid subsystems during the time period T2.

In some implementations, the computer 101 can determine the above correlation and difference based on the received first and second time-ordered fluid level measurements. Based on the determined correlation and difference, the computer can make a reliable prediction of whether and/or when the valve 113 or valve/actuator 115 is likely to malfunction, as will be described below.

Referring back to FIG. 3, as indicated by circle 306, the first time-ordered fluid level measurements are almost flat around 115% during a particular time period. Also, the measured reservoir quantity of 115% is the highest reservoir quantity for the first subsystem 111 during the entire time period as shown in FIG. 3. On the other hand, during the same particular period, the second time-ordered fluid level measurements are at a low level of 85%-90%. The measured first and second fluid level measurements during the particular period indicate that inter-system fluid leakage occurred between the two independent fluid subsystems 111 and 112 through the valve 113 or valve/actuator 115. The measurements also indicate that during this period, the fluid leaked from the subsystem 112 to the subsystem 111 and filled the subsystem 111 to an overfill condition, i.e., the reservoir of the subsystem 111 is full due to the fluid leakage.

In some implementations, the computer 101 can perform comparisons of respectively the first time-ordered fluid level measurements and the second time-ordered fluid level measurements. If the comparisons indicate an overfill condition of the first fluid subsystem 111 or the second fluid subsystem 112, the computer 101 can detect fluid transfer through the valve 113 or valve/actuator 115, as will be described below.

Figure 5:
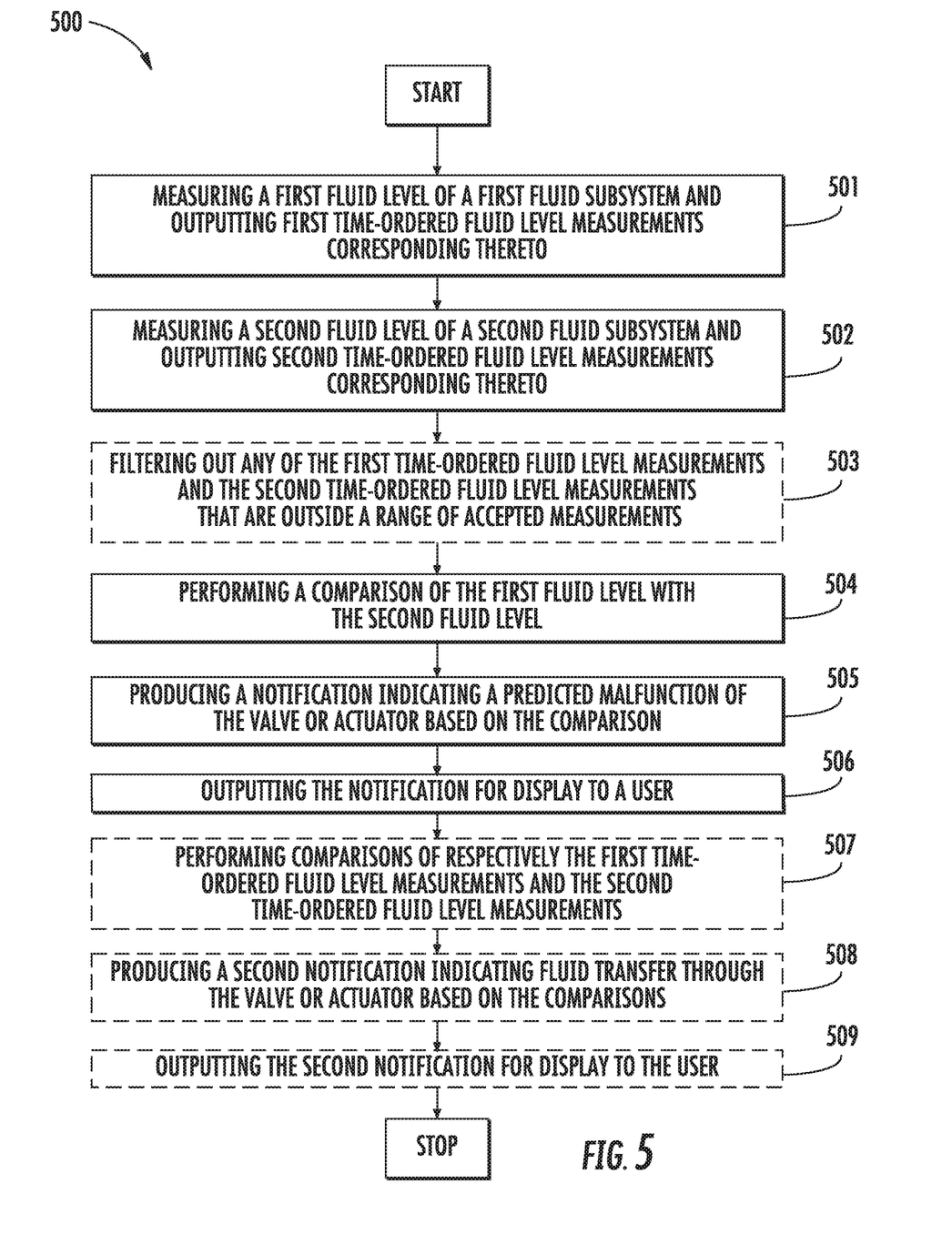
FIG. 5 is a flowchart illustrating various steps in a method of examining a closed fluid system composed of two fluid subsystems connected using a valve or actuator, according to various example implementations.

FIG. 5 is a flowchart illustrating various steps in a method 500 of examining a closed fluid system 110 composed of an independent first fluid subsystem 111 and an independent second fluid subsystem 112 connected via a valve 113 to a third (common) fluid subsystem 114, or an independent first fluid subsystem 111 and an independent second fluid subsystem 112 connected via a valve/actuator 115, according to various example implementations. In some examples, the valve/actuator 115 is located between the two independent fluid subsystems 111, 112. The method 500 is implemented by the diagnostic system 100 which includes the first sensor 102 disposed in the first fluid subsystem 111, the second sensor 103 disposed in the second fluid subsystem 112, and the computer 101 coupled to the first sensor and the second sensor.

At block 501, the sensor 102 measures a first fluid level of the first fluid subsystem 111, and outputs first time-ordered fluid level measurements corresponding thereto to the computer 101. Similarly, at block 502, the sensor 103 measures a second fluid level of the second fluid subsystem 112, and outputs second time-ordered fluid level measurements corresponding thereto to the computer 101.

At block 503, in some implementations, the computer 101 filters out any of the first time-ordered fluid level measurements and the second time-ordered fluid level measurements that are outside a range of accepted measurements. In one example, the accepted range of the reservoir quantities is from 50% to 150%. In other words, the computer 101 filters out any of the first time-ordered fluid level measurements and the second time-ordered fluid level measurements that have reservoir quantities below 50% or above 150%. The purpose of the filtering is to remove unreasonable fluid level measurements. The acceptable range maybe a different range.

At block 504, the computer 101 performs a comparison of the first fluid level with the second fluid level from the first time-ordered fluid level measurements and the second time-ordered fluid level measurements. In some implementations, performing the comparison includes the computer 101 determining a correlation and an absolute difference between the first time-ordered fluid level measurements and the second time-ordered fluid level measurements that define a divergence thereof. This may include the computer 101 determining the absolute difference at a specific time as the absolute difference between the reservoir quantities of the first and second fluid subsystems 111 and 112 measured at that time.

In the context of an aircraft in particular, the computer 101 may determine the correlation between the first time-ordered fluid level measurements and the second time-ordered fluid level measurements for a number of recent flights. In one example, the correlation is determined based on fluid level measurements for a predefined recent number of flights such as the most recent 10 flights of the aircraft. In another example, the correlation is determined based on fluid level measurements for all flights of the aircraft in a predefined recent time period such as all flights of the aircraft in recent 5 days. In another example, to avoid calculating correlation for an aircraft that was out of service for a particular time period, the computer 101 does not determine correlation if the time gap between the latest fluid level measurement and the earliest fluid level measurement for the aircraft is longer than a predefined period, e.g., 240 hours (10 days) although other time periods are possible.

In some implementations, the first fluid level measurements can be described as a variable X and the second fluid level measurements can be described as a variable Y. The computer 101 can determine the correlation, Correl, between variable X representing the first fluid level measurements and variable Y representing the second fluid level at a specific time as follows:

$$Correl(X, Y) = \frac{\sum_{i=1}^{n}(x_i - \bar{x})(y - \bar{y})}{\sqrt{\sum_{i=1}^{n}(x_i - \bar{x})^2 \sum_{i=1}^{n}(y_i - \bar{y})^2}} \quad (1)$$

where n denotes the most recent n fluid level measurements until the specific time. For example, n=10 may indicate fluid level measurements for the ten (10) most recent flights of the aircraft after the aircraft landed. Also, $x_i$ denotes the i-th first fluid level measurement in the most recent n first fluid level measurements. Similarly, $y_i$ denotes the i-th second fluid level measurement in the most recent n second fluid level measurements. Moreover, $\bar{x}$ denotes the average value of the most recent n first fluid level measurements and $\bar{y}$ denotes the average value of the most recent n second fluid level measurements. When n is larger, the correlation between variable X and variable Y is more accurate.

In some implementations, the absolute difference and the correlation between the first and second time-ordered fluid level measurements define a divergence between the first fluid level of the first fluid subsystem 111 and the second fluid level of the second fluid subsystem 112. In some implementations, the computer 101 determines whether the divergence is least a threshold divergence, which may indicate that inter-system fluid leakage occurs between the two fluid subsystems 111 and 112 through the valve 113 or valve/actuator 115 and that the valve 113 or valve/actuator 115 is likely to malfunction. In some examples, the divergence is at least the threshold divergence when the correlation is less than a predefined negative correlation and the absolute difference is greater than a predefined absolute difference. In one example, the predefined negative correlation is −0.5 and the predefined absolute difference is 15%, although other predefined values are also possible.

If after the comparisons, the divergence is at least the threshold divergence, at block 505, the computer 101 produces a notification indicating predicted inter-system fluid leakage. In some implementations, the predicted inter-system fluid leakage indicates the valve 113 or valve/actuator 115 has failed or is likely to fail. In some implementations, the valve is a left engine thrust reverser shuttle valve connecting the independent hydraulic systems, and the predicted inter-system fluid leakage indicates a malfunction of the left engine thrust reverser shuttle valve when the valve is closed. In some implementations, the actuator is a rudder power control unit connecting the independent hydraulic systems, and the predicted inter-system fluid leakage indicates a malfunction of the rudder power control unit. In some implementations, the valve is a landing gear transfer valve connecting the independent hydraulic systems, and the predicted inter-system fluid leakage indicates a malfunction of the landing gear transfer valve.

Based on the notification, maintenance can be scheduled for the closed fluid system. For example, after receiving the notification, technicians can check, repair and/or replace the valve 113 or valve/actuator 115 in a timely manner to prevent further inter-system fluid leakage. At block 506, the computer 101 outputs the notification for display to a user.

On the other hand, if the determined divergence is not at least the threshold divergence, this indicates that there is no or little inter-system fluid leakage between the two fluid subsystems and that the valve 113 or valve/actuator 115 is not malfunctioning. Thus, no notification is produced by the computer 101.

In some implementations, at block 507, the computer 101 performs comparisons of respectively the first time-ordered fluid level measurements and the second time-ordered fluid level measurements, which may include determining a first standard deviation for the first time-ordered fluid level measurements and a second standard deviation for the second time-ordered fluid level measurements. Similarly as described above, in some implementations, the first fluid level measurements can be described as a variable X and the second fluid level measurements can be described as a variable Y. The computer 101 can determine the standard deviation, SD, for variable X representing the first fluid level measurements and at a specific time as follows:

$$SD(X) = \sqrt{\frac{\sum_{i=1}^{n}(x_i - \bar{x})^2}{n-1}} \quad (2)$$

where n denotes the most recent n fluid level measurements until the specific time. For example, n=5 may indicate fluid level measurements for the five (5) most recent flights of the aircraft after the aircraft landed. Also, $x_i$ denotes the i-th first fluid level measurement in the most recent n first fluid level measurements and $\bar{x}$ denotes the average value of the most recent n first fluid level measurements. If the standard deviation for variable X is small, it indicates that the most recent n first fluid level measurements are flat without significant deviations among the n measurements. When n is larger, the standard deviation for variable X is more accurate. The computer 101 can determine the standard deviation for variable Y representing the second fluid level measurements similarly. In some implementations, to avoid calculating standard deviation for an aircraft that was out of service for a past time period, the computer 101 does not determine standard deviation if the time gap between the latest fluid level measurement and the earliest fluid level measurement is longer than a predefined period, e.g., 240 hours (10 days) although other time periods are possible.

In some implementations, the computer 101 determines whether fluid transfer between the two fluid subsystems 111 and 112 occurs based on the standard deviations and time-ordered fluid level measurements. In these implementations, the computer 101 compares the first standard deviation with a threshold standard deviation and the first time-ordered fluid level measurements (the measured reservoir quantities of the first fluid subsystem 111) with a threshold fluid level. The computer 101 also compares the second standard deviation with the threshold standard deviation and the second time-ordered fluid level measurements (the measured reservoir quantities of the second fluid subsystem 112) with the threshold fluid level. The computer 101 may then determine that fluid transfer occurs if the first standard deviation is less than the threshold standard deviation and the first time-ordered fluid level measurements are above the threshold fluid level, or the second standard deviation is less than the threshold standard deviation and the second time-ordered fluid level measurements are above the threshold fluid level. In one example, the threshold standard deviation is 0.3 and the threshold fluid level is 106%, although other threshold values can also be used.

If the comparisons indicate that inter-system fluid leakage occurs between the two fluid subsystems 111 and 112 through the valve 113 or valve/actuator 115 and one of the two fluid subsystems is in an overfill condition due to the inter-system fluid leakage, the method 500 proceeds to block 508 where the computer 101 produces a second notification indicating fluid transfer has occurred. For example, if the first standard deviation is less than the threshold standard deviation and the first time-ordered fluid level measurements are above the threshold fluid level, it indicates that the first fluid subsystem 111 is in an overfill condition due to the fluid leakage. In some implementations, the computer produces the second notification when the first standard deviation is less than a threshold standard deviation and the first time-ordered fluid level measurements are above a threshold fluid level, or the second standard deviation is less than the threshold standard deviation and the second time-ordered fluid level measurements are above the threshold fluid level. In some implementations, at block 509, the computer 101 outputs the second notification for display to the user. Based on the second notification, maintenance can be scheduled immediately. For example, after receiving the second notification, technicians can repair and/or replace a valve 113 or valve/actuator 115 immediately to resolve the inter-system fluid leakage.

On the other hand, if the comparisons indicate that there is no or little inter-system fluid leakage between the two fluid subsystems and that the valve 113 or valve/actuator 115 is not malfunctioning, the computer 101 does not produce the second notification.

According to example implementations of the present disclosure, the computer 101 may be implemented by various means. Means for implementing the computer 101 may include hardware, alone or under direction of one or more computer programs from a computer-readable storage medium. In some implementations, the computer 101 of the diagnostic system 100 is a component of an aircraft condition monitoring system (ACMS) onboard the aircraft. The ACMS onboard the aircraft can receive and record data reflecting the aircraft condition to determine whether maintenance should be scheduled for the aircraft. Thus, the computer 101 onboard the aircraft can implement the above mentioned methods. In some implementations, the computer 101 is a component of an operations center located separately from the aircraft. The aircraft includes a datalink system that transmits the first and second time-ordered fluid level measurements to the operations center such that the computer 101 at the operations center can implement the above mentioned methods.

In some examples, the computer 101 includes one or more of each of a number of components such as, for example, a processor (e.g., processing circuitry) connected to a memory (e.g., storage device). The processor is generally any piece of computer hardware that is capable of processing information such as, for example, data, computer programs and/or other suitable electronic information.

The memory is generally any piece of computer hardware that is capable of storing information such as, for example, data, computer programs (e.g., computer-readable program code) and/or other suitable information either on a temporary basis and/or a permanent basis. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

As explained above, computer-readable program code or instructions may be stored in memory, and executed by a processor that is thereby programmed, to implement functions of the computer 101 described herein. As will be appreciated, any suitable program code instructions may be loaded onto the computer 101 from a computer-readable storage medium to produce a particular machine, such that the particular machine becomes a means for implementing the functions specified herein. These program code instructions may also be stored in a computer-readable storage medium that can direct the computer 101, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into the computer 101, a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer 101, computer, processor or other programmable apparatus provide operations for implementing functions described herein.

Execution of instructions by a processor, or storage of instructions in a computer-readable storage medium, supports combinations of operations for performing the specified functions. In this manner, the computer 101 may include a processor and a computer-readable storage medium or memory coupled to the processor, where the processor is configured to execute computer-readable program code stored in the memory. It will also be understood that one or more functions, and combinations of functions, may be implemented by other special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A diagnostic system for a closed fluid system composed of a first fluid subsystem and a second fluid subsystem connected using a valve, the diagnostic system comprising:
   a first sensor disposed in the first fluid subsystem and configured to measure a first fluid level of the first fluid subsystem, and output first time-ordered fluid level measurements corresponding thereto;
   a second sensor disposed in the second fluid subsystem and configured to measure a second fluid level of the second fluid subsystem, and output second time-ordered fluid level measurements corresponding thereto; and
   a computer coupled to the first sensor and the second sensor, and configured to:
      receive the first time-ordered fluid level measurements and the second time-ordered fluid level measurements from respectively the first sensor and the second sensor;
      perform a comparison of the first fluid level with the second fluid level from the first time-ordered fluid level measurements and the second time-ordered fluid level measurements;
      produce a notification indicating a predicted malfunction of the valve when, based on the comparison, the first time-ordered fluid level measurements and the second time-ordered fluid level measurements have at least a threshold divergence; and
      output the notification for display to a user,
   wherein the computer configured to perform the comparison includes being configured to determine a correlation and an absolute difference between the first time-ordered fluid level measurements and the second time-ordered fluid level measurements that define a divergence thereof, and wherein the computer configured to produce the notification includes being configured to produce the notification when the divergence is at least the threshold divergence.

2. The diagnostic system of claim 1, wherein the divergence is at least the threshold divergence when the correlation is less than a predefined negative correlation, and the absolute difference is greater than a predefined absolute difference.

3. The diagnostic system of claim 1, wherein the computer is further configured to filter out any of the first time-ordered fluid level measurements and the second time-ordered fluid level measurements that are outside a range of accepted measurements before the comparison of the first fluid level with the second fluid level is performed from only those of the first time-ordered fluid level measurements and the second time-ordered fluid level measurements that are within the range.

4. The diagnostic system of claim 1, wherein the computer is further
configured to:
perform comparisons of respectively the first time-ordered fluid level measurements and the second time-ordered fluid level measurements;
produce a second notification indicating fluid transfer through the valve when, based on the comparisons, the first time-ordered fluid level measurements or the second time-ordered fluid level measurements indicate an overfill condition of respectively the first fluid subsystem or the second fluid subsystem; and
output the second notification for display to the user.

5. The diagnostic system of claim 4, wherein the computer configured to perform the comparisons includes being configured to determine a first standard deviation of the first time-ordered fluid level measurements, and a second standard deviation of the second time-ordered fluid level measurements, and
wherein the computer configured to produce the second notification includes being configured to produce the second notification when the first standard deviation is less than a threshold standard deviation and the first time-ordered fluid level measurements are above a threshold fluid level, or the second standard deviation is less than the threshold standard deviation and the second time-ordered fluid level measurements are above the threshold fluid level.

6. The diagnostic system of claim 1, wherein the diagnostic system is onboard an aircraft, and the first fluid subsystem and the second fluid subsystem are independent hydraulic systems of the aircraft.

7. The diagnostic system of claim 6, wherein the valve is a brake shuttle valve connecting the independent hydraulic systems, and the predicted malfunction indicates inter-system fluid leakage at the brake shuttle valve when the brake shuttle valve is closed.

8. The diagnostic system of claim 6, wherein the computer is a component of an aircraft condition monitoring system onboard the aircraft.

9. The diagnostic system of claim 6, wherein the aircraft includes a datalink system configured to transmit the first time-ordered fluid level measurements and the second time-ordered fluid level measurements to an operations center including the computer.

10. A method of examining a closed fluid system comprised of a first fluid subsystem and a second fluid subsystem connected using a valve, the method implemented by a diagnostic system including a first sensor disposed in the first fluid subsystem, a second sensor disposed in the second fluid subsystem, and a computer coupled to the first sensor and the second sensor, the method comprising:
measuring a first fluid level of the first fluid subsystem, and outputting first time-ordered fluid level measurements corresponding thereto, using the first sensor;
measuring a second fluid level of the second fluid subsystem, and outputting second time-ordered fluid level measurements corresponding thereto, using the second sensor;
performing, using the computer, a comparison of the first fluid level with the second fluid level from the first time-ordered fluid level measurements and the second time-ordered fluid level measurements;
producing, using the computer, a notification indicating a predicted malfunction of the valve when, based on the comparison, the first time-ordered fluid level measurements and the second time-ordered fluid level measurements have at least a threshold divergence; and
outputting, using the computer, the notification for display to a user,
wherein performing the comparison includes determining a correlation and an absolute difference between the first time-ordered fluid level measurements and the second time-ordered fluid level measurements that define a divergence thereof, and
wherein producing the notification includes producing the notification when the divergence is at least the threshold divergence.

11. The method of claim 10, wherein the divergence is at least the threshold divergence when the correlation is less than a predefined negative correlation, and the absolute difference is greater than a predefined absolute difference.

12. The method of claim 10, further comprising filtering out any of the first time-ordered fluid level measurements and the second time-ordered fluid level measurements that are outside a range of accepted measurements before the comparison of the first fluid level with the second fluid level is performed from only those of the first time-ordered fluid level measurements and the second time-ordered fluid level measurements that are within the range.

13. The method of claim 10, further comprising:
performing comparisons of respectively the first time-ordered fluid level measurements and the second time-ordered fluid level measurements;
producing a second notification using the computer, the second notification indicating fluid transfer through the valve when, based on the comparisons, the first time-ordered fluid level measurements or the second time-ordered fluid level measurements indicate an overfill condition of respectively the first fluid subsystem or the second fluid subsystem; and
outputting the second notification for display to the user.

14. The method of claim 13, wherein performing the comparisons includes determining a first standard deviation of the first time-ordered fluid level measurements, and a second standard deviation of the second time-ordered fluid level measurements, and
wherein producing the second notification includes producing the second notification when the first standard deviation is less than a threshold standard deviation and the first time-ordered fluid level measurements are above a threshold fluid level, or the second standard deviation is less than the threshold standard deviation and the second time-ordered fluid level measurements are above the threshold fluid level.

15. The method of claim 10, wherein the diagnostic system is onboard an aircraft, and the first fluid subsystem and the second fluid subsystem are independent hydraulic systems of the aircraft.

16. The method of claim 15, wherein the valve is a brake shuttle valve connecting the independent hydraulic systems, and the predicted malfunction indicates inter-system fluid leakage at the brake shuttle valve when the brake shuttle valve is closed.

17. The method of claim 15, wherein the computer is a component of an aircraft condition monitoring system onboard the aircraft.

18. The method of claim 15, wherein the aircraft includes a datalink system, and the method further comprises the datalink system transmitting the first time-ordered fluid level measurements and the second time-ordered fluid level measurements to an operations center including the computer.

19. A diagnostic system for a closed fluid system composed of a first fluid subsystem and a second fluid subsystem connected using a valve, the diagnostic system comprising:
- a first sensor disposed in the first fluid subsystem and configured to measure a first fluid level of the first fluid subsystem, and output first time-ordered fluid level measurements corresponding thereto;
- a second sensor disposed in the second fluid subsystem and configured to measure a second fluid level of the second fluid subsystem, and output second time-ordered fluid level measurements corresponding thereto; and
- a computer coupled to the first sensor and the second sensor, and configured to:
  receive the first time-ordered fluid level measurements and the second time-ordered fluid level measurements from respectively the first sensor and the second sensor;
  perform a comparison of the first fluid level with the second fluid level from the first time-ordered fluid level measurements and the second time-ordered fluid level measurements;
  produce a notification indicating a predicted malfunction of the valve when, based on the comparison, the first time-ordered fluid level measurements and the second time-ordered fluid level measurements have at least a threshold divergence;
  output the notification for display to a user;
  perform comparisons of respectively the first time-ordered fluid level measurements and the second time-ordered fluid level measurements;
  produce a second notification indicating fluid transfer through the valve when, based on the comparisons, the first time-ordered fluid level measurements or the second time-ordered fluid level measurements indicate an overfill condition of respectively the first fluid subsystem or the second fluid subsystem; and
  output the second notification for display to the user,
wherein the computer configured to perform the comparisons includes being configured to determine a first standard deviation of the first time-ordered fluid level measurements, and a second standard deviation of the second time-ordered fluid level measurements, and
wherein the computer configured to produce the second notification includes being configured to produce the second notification when the first standard deviation is less than a threshold standard deviation and the first time-ordered fluid level measurements are above a threshold fluid level, or the second standard deviation is less than the threshold standard deviation and the second time-ordered fluid level measurements are above the threshold fluid level.

* * * * *